United States Patent [19]
Nagata et al.

[11] Patent Number: 4,493,507
[45] Date of Patent: Jan. 15, 1985

[54] TILTING TYPE SUNROOF

[75] Inventors: Kazuhisa Nagata, Okazaki; Keiji Mori, Toyota; Asao Ogasawara, Hekinan, all of Japan

[73] Assignee: Aisin Seiki Kabushiki Kaisha, Kariya, Japan

[21] Appl. No.: 492,329

[22] Filed: May 6, 1983

[30] Foreign Application Priority Data

May 6, 1982 [JP] Japan .................................. 57-75756

[51] Int. Cl.³ ............................................. B60J 7/08
[52] U.S. Cl. .................................... 296/216; 296/221
[58] Field of Search ................ 296/221, 216, 222, 223

[56] References Cited

U.S. PATENT DOCUMENTS

| Re. 28,346 | 2/1975 | Kouth et al. | 296/221 |
| 4,085,965 | 4/1978 | Schlapp | 296/221 |
| 4,272,122 | 6/1981 | Schatzler | 296/221 |
| 4,403,805 | 9/1983 | Strem, Jr. | 296/221 |
| 4,417,763 | 11/1983 | Schlapp | 296/221 |

FOREIGN PATENT DOCUMENTS 2839786  3/1980  Fed. Rep. of Germany .

Primary Examiner—Robert R. Song
Attorney, Agent, or Firm—Sughrue, Mion, Zinn, Macpeak and Seas

[57] ABSTRACT

A tilting type sunroof comprises a roof panel supported with a lift link which is pivotally connected with a shoe. An arm of the lift link is engaged with an inclined groove of a stationary guide. The arm slides along the inclined groove to rotate with a linear movement of the shoe. The roof panel is driven to open or close a roof opening by the rotation of the arm. The inclined groove of the stationary guide has a portion of a large inclination and a portion of a small inclination such that a shift amount of the panel with respect to a shift amount of the shoe is large where the panel is substantially opened, while small where the panel is substantially closed.

5 Claims, 7 Drawing Figures

TILTING TYPE SUNROOF

BACKGROUND OF THE INVENTION

This invention relates to a sunroof of motor vehicles, and more particularly to an opening and closing mechanism for such a sunroof.

Heretofore, a link means, a screw means or the like has been used in the mechanism for opening and closing a sunroof of motor vehicles, which has one edge pivotably connected to the vehicular roof. The mechanism of this kind has a large size and a complicated construction, and therefore it is difficult to house such mechanism in a narrow space at the rear of a trim plate. In addition, the load induced at the start of opening is large and smoothness of the operation can not be obtained sufficiently.

As an improved device, there has been proposed a roof panel opening and closing mechanism which is composed of shoes pulled by cables to move forward and backward along guide rails on both sides of an opening formed in the roof, a lever pivotably connected to each of the shoes, an arm integral with the lever, pins mounted at both free ends of the arm and the lever, a cam member having a cam groove with which the pin of the arm is engaged, a bracket fixed to the under surface of the roof panel and having a long hole with which the pin of the lever is engaged, a drive gear in mesh with the cables, and other parts. This invention is related to an improvement of such roof panel opening and closing mechanism, which employs shoes moving forward and backward along guide rails.

In such an opening and closing mechanism mentioned above, pins are erected at positions respectively corresponding to three apexes of a triangular lift link (composed of the lever and the arm). The first pin at one end of the lift link is engaged with a guide groove in the bracket fixed to the roof panel, while the second pin at the other end thereof is engaged with an inclined groove in the stationary guide. And the remaining third pin positioned between those two pins is pivotally connected to the shoe. When the shoe is driven in one direction, the lift link moves in the same direction as the shoe and at the same time, the second pin descends along the inclined groove. When this happens, the lift link is rotated in one direction so that the first pin pushes up the bracket in the panel opening direction. Meanwhile, when the shoe is driven in the other direction, the lift link moves in the same direction as the shoe and at the same time, the second pin ascends along the inclined groove. When this happens, the lift link is rotated in the other direction so that the first pin lowers the bracket in the panel closing direction. Since the inclined groove has a linear form, the moving speed of the panel in the opening and closing directions is substantially in proportion to that of the shoe. In other words, the extent of movement of the panel in the opening and closing stroke is substantially in proportion to the extent of movement of the shoe. As a result, in such a construction where a seal member is fitted over the edge of the panel and the opening is closed up tightly upon closing of the panel, a relatively large force is required when opening the panel from the closed-up state as well as when closing the panel into the closed-up state after the seal member has come into contact with the edge of the opening. In the process of turning a handle to close the panel, therefore, one unfamiliar with the operation of such a mechanism often believes that the panel has been closed completely when the handle becomes hard to turn. In this state, however, the panel is not yet closed up into the air-tight state. To the contrary, when opening the panel from the closed-up state, the handle is hard to turn at the beginning and then becomes easy to turn abruptly after it has been turned to some degree. Thus, the mechanism can not be operated smoothly.

SUMMARY OF THE INVENTION

It is an object of this invention to smooth the opening and closing operation of the panel.

To achieve the above object, according to this invention, an inclined groove (i.e., guide groove) formed in a stationary guide is so shaped that it has a large inclination angle in the region where a roof panel is opened to a large extent, during the process of guiding a movement of the second pin of a lift link, and it has a small inclination angle in the region where the roof panel closes the opening, during the process of guiding a movement of the second pin of the lift link. In one preferred embodiment of this invention, the inclined groove in the stationary guide has such a form that the linear portion with a large inclination angle is continuously joined to the linear portion with a small inclination angle. In another preferred embodiment of this invention, the inclined groove in the stationary guide has such a curved form that its inclination angle is changed continuously and gradually.

With this construction, the ratio dLp/dLs of the extent of movement of the panel in its opening and closing stroke with respect to the extent of movement of a shoe is small in the region where the panel is substantially closed, while the ratio dLp/dLs becomes large in the region where the panel is opened. Stated differently, although the ratio dLp/dLs is small in the panel closed region, a force necessary for driving the shoe becomes small correspondingly, so that a handle may be turned smoothly. When the handle is turned at a constant speed in the panel opening direction in the state where the panel is closed up, the panel starts to open slowly after a seal member of the panel has departed from the edge of the opening. When the handle is turned at a constant speed in the panel closing direction from the state where the panel is opened, the panel closes first at a higher speed and then comes into the closed-up state under a lower speed. During this closing stroke, a force necessary for turning the handle is hardly changed. The panel opening and closing mechanism thus arranged also contributes to maintain the panel in the closed-up state. More specifically, even if there be play in the mechanism, a slippage of the panel in its opening and closing stroke caused by such play is reduced, because the extent of movement of the panel in its opening and closing stroke is small with respect to the extent of movement of the shoe in the panel closed state. With this, the closed-up state of the panel can be held assuredly by an elastic force of the seat member, and hence a high resistant performance against shocks or vibrations can be attained.

BRIEF DESCRIPTION OF THE DRAWINGS

FIGS. 1 to 6 illustrate one preferred embodiment of this invention in which;

FIG. 1 is a plan view showing the right-hand half portion of a motor vehicle roof, where the left-hand side corresponds to the front portion of the vehicle and the right-hand side corresponds to the rear portion thereof;

FIG. 2 is a perspective view showing the entire of a panel opening and closing mechanism;

FIG. 3 is an enlarged plan view of the lift link 10 and the vicinity thereof;

FIG. 4 is an enlarged sectional view taken along the line IV—IV in FIG. 1;

FIG. 5 is a sectional view taken along the line V—V in FIG. 3;

FIG. 6 is an enlarged side view of the guide member 9; and

DESCRIPTION OF EMBODIMENT

Figure 1:
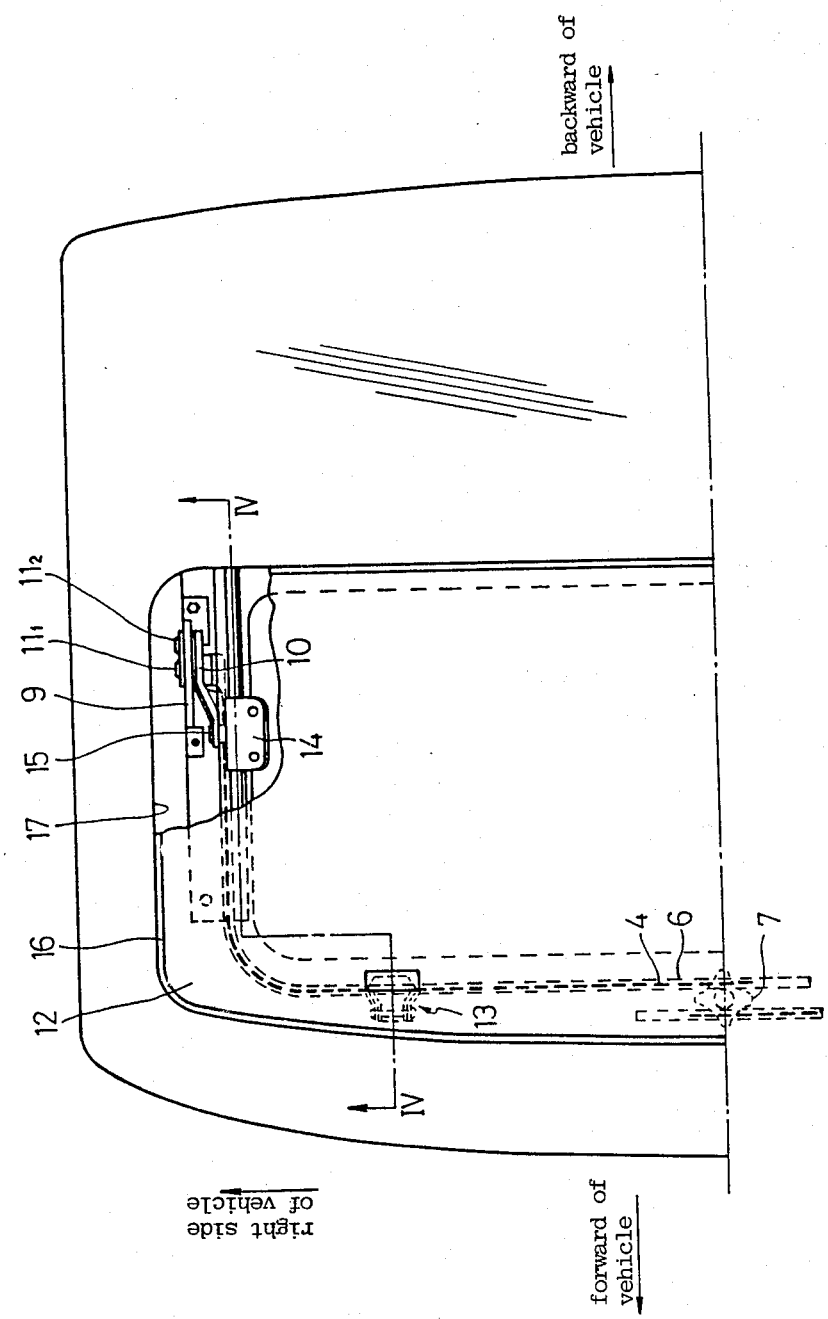
Figure 2:
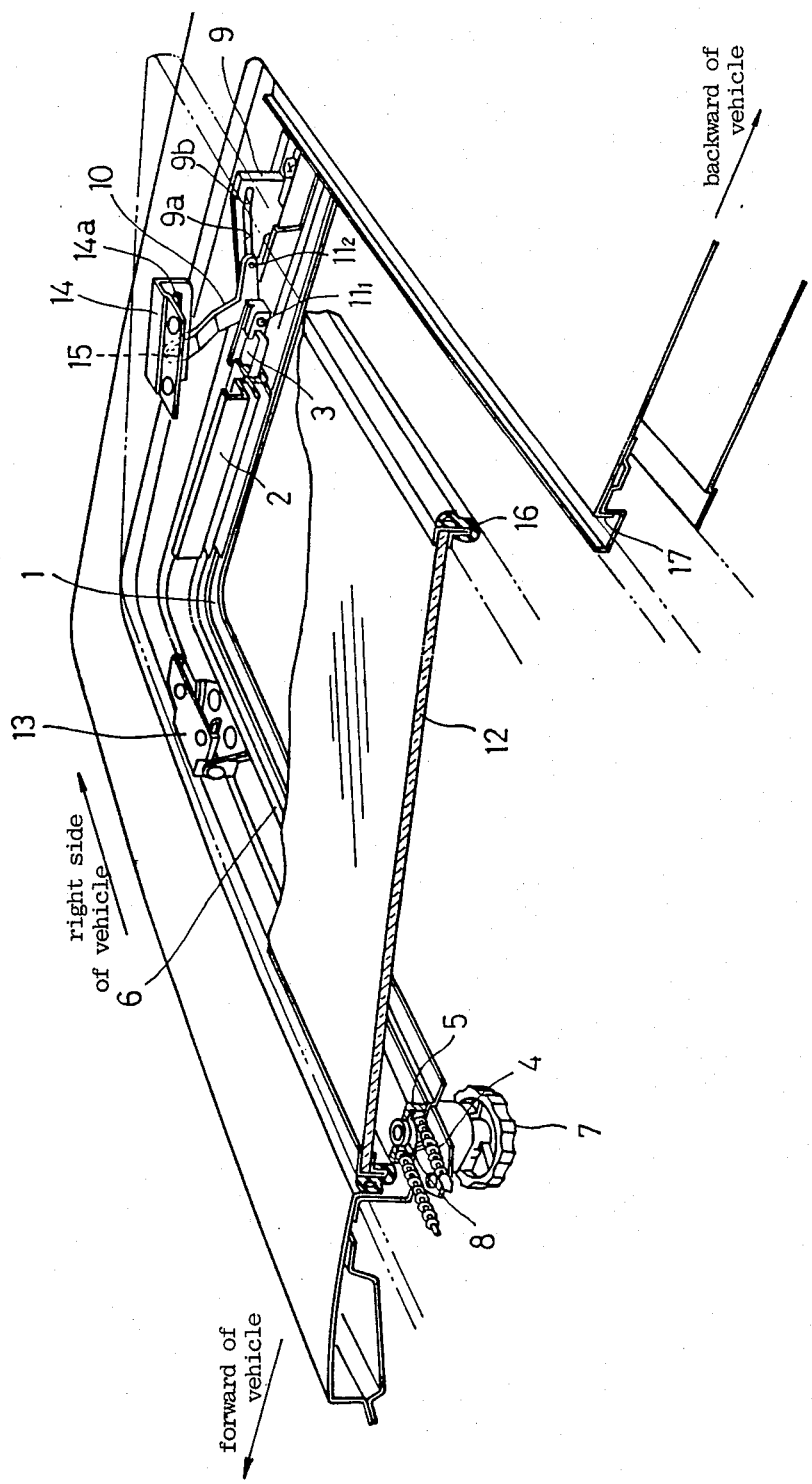
Figure 3:
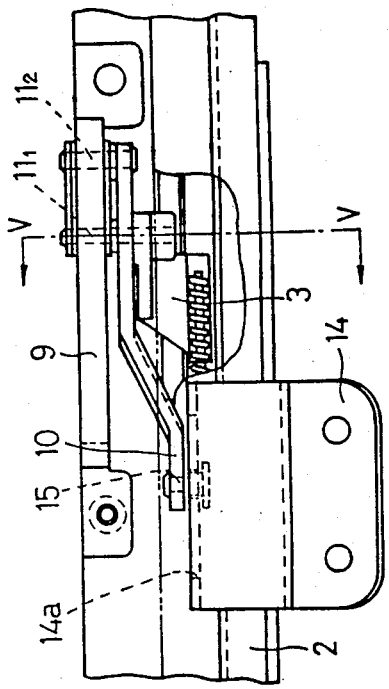

Referring to FIGS. 1 to 6, an opening 17 is formed in a roof of a motor vehicle, and a housing 1 is rigidly fixed to the peripheral edge of the opening 17. The housing 1 extends along the edge of the opening 17, and one end portion of a glass panel 12 is pivotably connected to the housing 1 by means of a hinge 13 on the front side of the opening. An elastic seal 16 for protection against water is fixedly attached over the entire edge of the glass panel 12, and it is positioned between the edge of the panel 12 and the opening 17 in the state where the panel 12 is closed, thereby closing the opening 17 in a watertight manner.

A guide rail 2 and a guide member 9 are rigidly fixed to the housing 1 on opposite sides of the opening 17, and a shoe 3 is guided by the guide rail 2. To the shoe 3 is connected one end of a geared cable 4 which extends through a casing 6 up to a gear box 5, where it meshes with a drive pinion 8 rigidly fixed to a handle 7. When the handle 7 is turned in one direction, the geared cable 4 is pushed out so that the shoe 3 is driven to move toward the rear portion of the vehicle. On the other hand, the handle 7 is turned in the reverse direction, the geared cable 4 is pulled in so that the shoe 3 is driven to move toward the front portion of the vehicle. A third pin $11_1$ is pivotably fixed to the shoe 3, and a lift link 10 in turn is pivotably connected to the third pin $11_1$. The lift link 10 has a first pin 15 fixed at one end thereof and a second pin $11_2$ fixed at another end thereof. The first pin 15 is engaged with a guide groove 14a formed in a bracket 14 which is rigidly fixed to the glass panel 12, while the second pin $11_2$ is engaged with a guide groove (i.e., inclined groove) 9a or 9b formed in the guide member 9. When the shoe 3 is driven to move toward the front portion of the vehicle, the lift link 10 is moved also toward the front portion of the vehicle, and at the same time the second pin $11_2$ descends along the guide grooves 9a and 9b. Upon this, the lift link 10 is rotated in the clockwise direction (in FIG. 2) so as to push up the glass panel 12. On the other hand, when the shoe 3 is driven to move toward the rear portion of the vehicle, the lift link 10 is moved also toward the rear portion of the vehicle, and at the same time the second pin $11_2$ ascends along the guide grooves 9a and 9b. Upon this, the lift link 10 is rotated in the counterclockwise direction (in FIG. 2) so as to pull down the glass panel 12.

Figure 4:
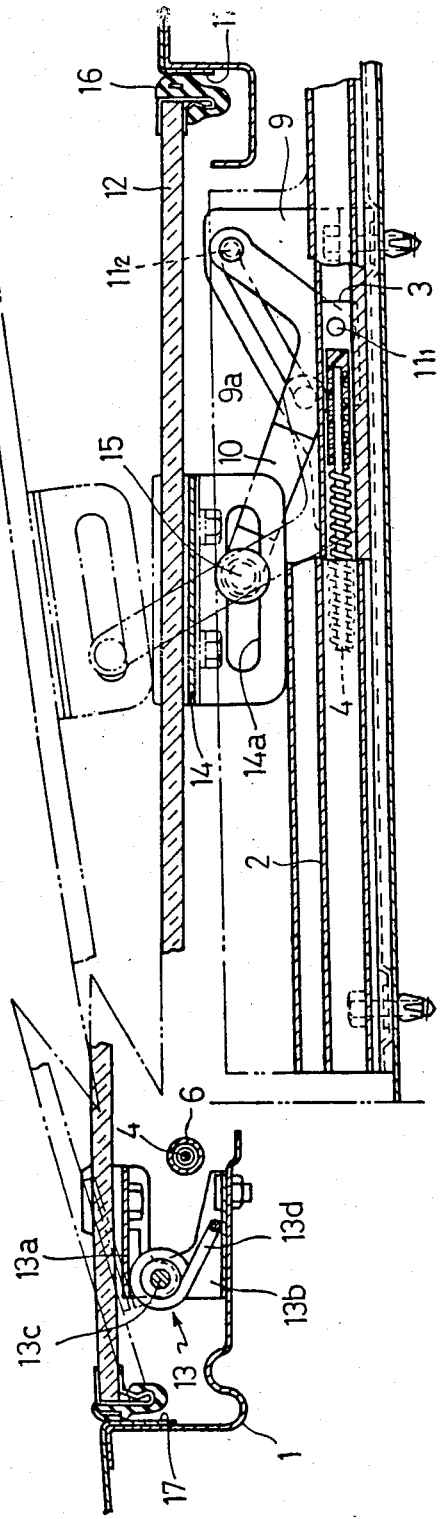
Figure 5:
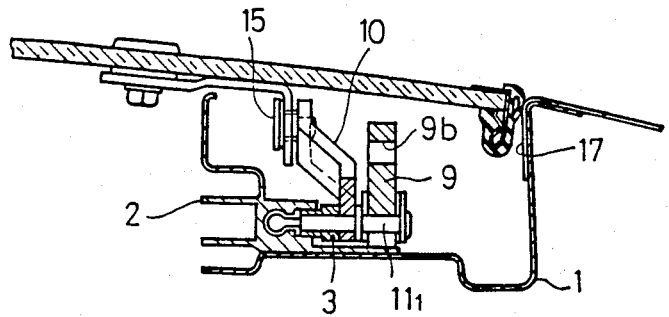

As will be clear from FIG. 4, the hinge 13 serves to rotatably connect an upper plate 13a and a lower plate 13b with each other through a pin 13c. More specifically, a spring 13d is fitted over the outer periphery of the pin 13c, thereby to apply a turning force in the counterclockwise direction to the upper plate 13a at all times. The upper plate 13a and the lower plate 13b are rigidly fixed to the glass plate 12 and the housing 1, respectively. Therefore, a turning force in the opening direction is applied to the glass panel 12 by virtue of the spring 13d. If the spring 13d is not used, an operational force necessary for opening the panel 12 will be larger than that necessary for closing the panel 12. Due to the presence of the spring 13d, it is possible to reduce a difference between those operational forces.

Figure 6:
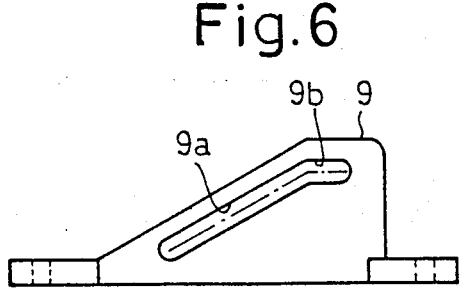

As will be seen from FIG. 6, the guide groove formed in the guide member 9 comprises the groove 9a with a high inclination for guiding the second pin $11_2$ in the region where the glass panel 12 is opened, and the groove 9b with a low inclination for guiding the second pin $11_2$ in the region where the glass panel 12 is closed, the grooves 9a and 9b being joined to each other continuously. When the second pin $11_2$ locates in the groove 9a (i.e., in the state of FIG. 2 and the state indicated by two-dot chain lines of FIG. 4), the lift link 10 is rotated by a relatively large angle $d\theta pl$ along with a movement of the shoe 3 in a predetermined amount dLs. To the contrary, when the second pin $11_2$ locates in the groove 9b (i.e., in the state indicated by solid lines of FIG. 4), a rotated angle $d\theta ps$ of the lift link 10 becomes smaller with respect to a movement of the shoe 3 in a predetermined amount dLs. Since the value of $d\theta pl$, s/dLs is substantially in proportion to the required operational force, the handle can be turned with a smaller force when the second pin $11_2$ locates in the groove 9b. At this time, however, the seal 16 is in contact with the edge of the opening 17 (in the state indicated by solid lines of FIG. 4), so that a larger operational force is needed for opening the glass panel. This increase in the required operational force due to contact of the seal 16 with the edge of the opening 17 is substantially offset by a decrease in the required operational force due to a small inclination of the groove 9b, whereby the glass panel 12 can be opened and closed smoothly to have any desirous opening angle within a preset range.

The opening and closing mechanism as mentioned above is also provided likewise in the left-hand half portion of the motor vehicle in common with handle 7 as well as the drive pinion 8. This left-hand mechanism is driven by turning the handle 7 in a similar manner.

The seal 16 is fitted over four sides of the glass panel 12. In this connection, frictional resistance between the seal 16 and the opening 17 at the front edge is not depending on an opening angle of the panel so much, but frictional resistance at both side edges is increased so much as an opening angle of the panel becomes smaller. Meanwhile, as for the rear edge, when the panel 12 is gradually closed and the seal 16 begins to come into contact with the edge of the opening, frictional resistance is increased abruptly. At the time when the seal 16 is brought into contact with the opening edge, the second pin $11_2$ positions at the boundary between the grooves 9a and 9b.

Figure 7:
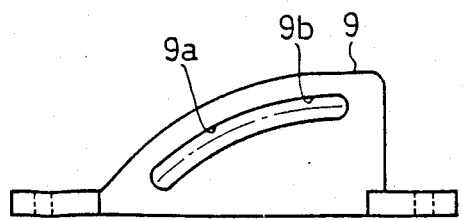
FIG. 7 is a side view showing a modified embodiment of the guide member 9.

FIG. 7 shows a modified embodiment of the guide member 9. In this embodiment, the groove 9a with a high inclination and the groove 9b with a low inclination have a continuously curved form, in order that the required operational force is made constant with respect to a change in frictional resistance between the seal 16 and the opening 17 at both side edges thereof, which change is caused in accordance with an opening angle the panel 12.

In either case using the guide member 9 shown in FIG. 6 or FIG. 7, since the second pin $11_2$ locates in the groove 9b with a small inclination in the region where the panel is closed, the panel 12 is maintained securely in the closed-up state with a high resistence to shocks or vibrations, even if there is some play in the opening and closing mechanism.

What we claim is:

1. A tilting type sunroof comprising:

a roof panel having one end portion pivotably connected to the front edge portion of an opening formed in a motor vehicle roof;

brackets rigidly fixed to said roof panel adjacent each side edge thereof;

guide rails fixedly disposed along opposite side edges of said opening;

a shoe fitted in each of said guide rails for movement along the same;

a guide member secured to said edges of said opening adjacent each of said guide rails and having a guide groove which is inclined with respect to each of said guide rails;

a pair of links each having one end portion engaged with a guide groove formed in each of said brackets, having another end portion engaged with said guide groove in said guide member, and pivotably connected to said shoe at a position corresponding to the remaining one apex of a triangle where said engaged points constitute two apexes thereof; and a means for driving said shoe to move along said guide rail;

said guide groove in said guide member being formed with a large inclination angle in the region where said roof panel is opened to a large extent, during the movement of said another end portion of said lift link along said guide groove and with a small inclination angle in the region where said roof panel is closed, during the movement of said another end portion of said lift link.

2. A tilting type sunroof according to claim 1, wherein said guide groove in said guide member has such a form that the linear portion with a large inclination angle is continuously joined to the linear portion with a small inclination angle.

3. A tilting type sunroof according to claim 1, wherein said guide groove in said guide member has such a curved form that its inclination angle is changed continuously and gradually.

4. A tilting type sunroof according to claim 1, wherein a seal member is fixedly attached over the edge of at least one of said opening and said roof panel.

5. A tilting type sunroof according to claim 1, wherein said roof panel is pivotably connected to the front edge portion of said opening formed in said motor vehicle roof by means of hinges, and a spring means is provided to produce a resilient force for urging said roof panel to open said opening.

* * * * *